United States Patent [19]

Lane et al.

[11] 4,272,391

[45] Jun. 9, 1981

[54] HYDRATED MG(NO$_3$)$_2$ REVERSIBLE PHASE CHANGE COMPOSITIONS

[75] Inventors: George A. Lane; Harold E. Rossow, both of Midland, Mich.

[73] Assignee: The Dow Chemical Company, Midland, Mich.

[21] Appl. No.: 90,789

[22] Filed: Nov. 2, 1979

[51] Int. Cl.$^3$ .............................................. C09K 5/06
[52] U.S. Cl. .................................... 252/70; 126/400; 165/DIG. 4; 165/104.21
[58] Field of Search ................... 126/400; 165/104 S, 165/104 M, DIG. 4, 17; 252/67, 70

[56] References Cited

U.S. PATENT DOCUMENTS

| | | | |
|---|---|---|---|
| 2,677,664 | 5/1954 | Telkes | 252/70 |
| 2,706,716 | 4/1955 | Howe et al. | 252/70 |
| 2,856,506 | 10/1958 | Telkes | 219/39 |
| 3,536,059 | 10/1970 | Hearst | 126/204 |
| 3,973,552 | 8/1976 | Ervin | 126/271 |
| 4,003,426 | 1/1977 | Best et al. | 165/53 |
| 4,109,702 | 8/1978 | Greene | 165/1 |
| 4,117,882 | 10/1978 | Shurcliff | 165/104 S |

FOREIGN PATENT DOCUMENTS

| | | |
|---|---|---|
| 2550106 | 5/1976 | Fed. Rep. of Germany . |
| 2396061 | 1/1979 | France . |
| 50-90585 | 7/1975 | Japan . |
| 51-43387 | 4/1976 | Japan . |
| 51-70193 | 6/1976 | Japan . |
| 51-76183 | 7/1976 | Japan . |
| 51-126980 | 11/1976 | Japan . |
| 53-19183 | 2/1978 | Japan . |
| 53-14785 | 5/1978 | Japan ........................................ 252/70 |
| 53-70989 | 6/1978 | Japan . |
| 2001096 | 1/1979 | United Kingdom . |
| 568669 | 9/1977 | U.S.S.R. . |

OTHER PUBLICATIONS

Yoneda et al., "Eutectic Mixtures for Solar Heat Storage," *Solar Energy*, vol. 21, pp. 61-63, 1978.
Public Disclosure, NSF/RANN Contract No. NSF-C906.

*Primary Examiner*—P. E. Willis, Jr.

[57] ABSTRACT

A reversible liquid solid phase change composition comprising hydrated Mg(NO$_3$)$_2$ and one of the group of MgO, Mg(OH)$_2$, MgCO$_3$, CaO, Ca(OH)$_2$, and/or CaCO$_3$, added to the composition in an effective amount to suppress supercooling of the Mg(NO$_3$)$_2$ liquid phase.

17 Claims, No Drawings

HYDRATED MG(NO$_3$)$_2$ REVERSIBLE PHASE CHANGE COMPOSITIONS

FIELD OF THE INVENTION

The invention relates to reversible liquid/solid phase change compositions. More particularly, the invention relates to hydrated Mg(NO$_3$)$_2$ phase change compositions containing additives to modify the supercooling properties of the Mg(NO$_3$)$_2$ liquid phase.

BACKGROUND OF THE INVENTION

Mg(NO$_3$)$_2$.6H$_2$O undergoes a phase transition at about 89° C. (about 192° F.) releasing or alternately absorbing a substantial quantity of latent heat of fusion. As such, the material has advantageous properties for use as an encapsulated heat storage medium for use in conjunction with solar energy systems for hydronic heating and off peak electrical power heat storage applications. In order to improve the material for such applications, however, there is a need to develop additives or a series of additives to modify the supercooling properties of hydrated Mg(NO$_3$)$_2$ compositions, and most advantageously, additives which are highly effective in a very small amount.

Terms

Hydrated Mg(NO$_3$)$_2$ means reversible liquid/solid phase change compositions which, exclusive of any additives or impurities, contain in admixture from about 54-62 weight percent Mg(NO$_3$)$_2$, and the balance water (to 100 weight percent). Most preferred is a hydrate having a melt/freeze temperature of about 89° C. (192° F.), and prepared by admixing about 57.8 weight percent Mg(NO$_3$)$_2$ in about 42.2 weight percent water. The predominate crystal form in compositions of the invention is the hexahydrate.

"Supercooling" refers to a discrepancy between the temperature at which freezing initiates and the thawing temperature of a given hydrated Mg(NO$_3$)$_2$ composition, when cooled and heated under quiet conditions.

"Additive(s)" includes in addition to the nucleating additives specified herein, precursors of such additives nondetrimental to the purposes of the invention.

THE INVENTION

The invention is the discovery of a new class of highly active nucleating additives for hydrated Mg(NO$_3$)$_2$ compositions. The invention particularly is a composition comprising hydrated Mg(NO$_3$)$_2$, and which includes as a nucleating additive to such composition, one or more of the group of MgO, Mg(OH)$_2$, MgCO$_3$, CaO, Ca(OH)$_2$, and CaCO$_3$ added in an amount effective to suppress the supercooling properties of the hydrated Mg(NO$_3$)$_2$ liquid phase. Sufficient of the additive(s) is present in the preferred practice to suppress supercooling to no greater than about 2° C. taken on an averaging basis over repeated cycles.

The effective amount of additive is determined by testing a given composition over repetitive phase change cycles. A given nucleating additive, if present in an insufficient amount may, for example, exhibit only temporary effectiveness. Such behavior is overcome by adding slightly greater amounts of that given additive.

The compositions hereof are ideally packaged in individual encapsulating means for use in the capacity of a heat storage medium. Exemplary of suitable and known encapsulating means for the heat storage compositions hereof, are water impervious foils of plastic/metal laminates. Also, closed cell plastic foams have been suggested in which the heat storage composition may be encapsulated within the cells of the foam structure, as illustrated, for example, in U.S. Pat. No. 4,003,426, incorporated herein by reference. Yet other useful encapsulating means are metal or plastic cans, such as inexpensive aerosol cans; metal or plastic pipe, such as extruded polyethylene pipe; and the like. Further details respecting such encapsulating means are given in Report Nos. ORO/5217-8 and NSF RANN SE C906 FR76 1, both available from the National Technical Information Service, Springfield, Virginia, and fully incorporated herein by reference.

EXAMPLE

The data of the Table below are generated by preparing hydrated Mg(NO$_3$)$_2$ samples according to the ratios indicated, and wherein the mixed samples of each specified ratio are placed into a two-ounce glass vial, which is then heated to about 100° C. under agitation to achieve a uniform dispersion or admixture. A glass-encased thermocouple is inserted through the cap of each vial to measure temperature changes at the center of each sample prior to, during and after freezing. The cooling temperature is controlled and maintained within the range of about 20°-25° C. (room temperature). Sample No. 7, below, is a control sample of analytical grade Mg(NO$_3$)$_2$ hydrated with deionized water.

TABLE

| | Sample | Additive Material | wt.% | No. of Tests | Supercooling Ave. °C. |
|---|---|---|---|---|---|
| 1 | 46.24g Mg(NO$_3$)$_2$ + 33.76g·H$_2$O | Mg(OH)$_2$ | 0.1 | 68 | 0.2 |
| 2 | " | MgO | 0.1 | 66 | 0.1 |
| 3 | " | MgCO$_3$ | 0.1 | 5 | 0. |
| 4 | " | Ca(OH)$_2$ | 0.1 | 5 | 0. |
| 5 | " | CaO | 0.1 | 5 | 0. |
| 6 | " | CaCO$_3$ | 0.1 | 5 | 0. |
| 7 | " | None | — | 6 | 11. |

It is understood that nucleating additives other than as specifically taught herein may be used in conjunction with the highly effective additives of Sample Nos. 1-6 to prepare improved Mg(NO$_3$)$_2$ phase change compositions. While the data also illustrate that very little of the additives hereof produce marked benefits (average supercooling less than about 2° C.) such additives, of course, may be incorporated in larger amounts, but preferably would not exceed the amount of about 2.0 weight percent of the weight of the phase change composition.

What is claimed is:

1. A reversible liquid/solid phase change composition comprising hydrated Mg(NO$_3$)$_2$ and as a nucleating additive, one or more of MgO, Mg(OH)$_2$, MgCO$_3$, CaO, Ca(OH)$_2$, or CaCO$_3$, added to the composition in an amount effective to suppress average supercooling of the Mg(NO$_3$)$_2$ liquid phase to about 2° C. or less.

2. The composition of claim 1, wherein the hydrated Mg(NO$_3$)$_2$ consists of about 57.8 weight percent Mg(NO$_3$)$_2$ and the balance is water to 100 weight percent.

3. The composition of claim 1 hermetically contained within encapsulating means.

4. The composition of claim 1 wherein the additive comprises not greater than about 2.0 weight percent MgO.

5. The composition of claim 1 wherein the additive comprises not more than about 2.0 weight percent Mg(OH)$_2$.

6. The composition of claim 1 wherein the additive comprises not greater than about 2.0 weight percent MgCO$_3$.

7. The composition of claim 1 wherein the additive comprises not greater than about 2.0 weight percent CaO.

8. The composition of claim 1 wherein the additive comprises not greater than about 2.0 weight percent Ca(OH)$_2$.

9. The composition of claim 1 wherein the additive comprises not greater than about 2.0 weight percent CaCO$_3$.

10. A method of preparing a hydrated Mg(NO$_3$)$_2$ composition of suppressed supercooling properties, comprising admixing uniformly in such composition, one or more of MgO, Mg(OH)$_2$, MgCO$_3$, CaO, Ca(OH)$_2$, or CaCO$_3$, in an amount effective to suppress average supercooling of the Mg(NO$_3$)$_2$ liquid phase to about 2° C. or less.

11. The method of claim 10, wherein the hydrated Mg(NO$_3$)$_2$ consists of about 57.8 weight percent Mg(NO$_3$)$_2$ and the balance is water to 100 weight percent.

12. The method of claim 10 using the additive MgO.

13. The method of claim 10 using the additive Mg(OH)$_2$.

14. The method of claim 10 using the additive MgCO$_3$.

15. The method of claim 10 using the additive CaO.

16. The method of claim 10 using the additive Ca(OH)$_2$.

17. The method of claim 10 using the additive CaCO$_3$.

* * * * *